US012694500B2

(12) United States Patent
Tooyama

(10) Patent No.: US 12,694,500 B2
(45) Date of Patent: Jul. 28, 2026

(54) MASK-SETTING DEVICE

(71) Applicant: FANUC CORPORATION, Yamanashi (JP)

(72) Inventor: Wataru Tooyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 419 days.

(21) Appl. No.: 18/027,776

(22) PCT Filed: Nov. 5, 2021

(86) PCT No.: PCT/JP2021/040772
§ 371 (c)(1),
(2) Date: Mar. 22, 2023

(87) PCT Pub. No.: WO2022/102533
PCT Pub. Date: May 19, 2022

(65) Prior Publication Data
US 2024/0029228 A1     Jan. 25, 2024

(30) Foreign Application Priority Data

Nov. 10, 2020     (JP) ................................. 2020-187326

(51) Int. Cl.
*G06T 7/00*          (2017.01)
*G06T 7/12*          (2017.01)
(Continued)

(52) U.S. Cl.
CPC .............. *G06T 7/0004* (2013.01); *G06T 7/12* (2017.01); *G06T 7/194* (2017.01); *G06V 10/25* (2022.01);
(Continued)

(58) Field of Classification Search
CPC ......... G06T 7/10–194; G06T 7/50–596; G06T 2207/10028; G06T 2207/10004–10024;
(Continued)

(56) References Cited

U.S. PATENT DOCUMENTS 6,304,050 B1    10/2001   Skaar et al.
2009/0290758 A1*  11/2009   Ng-Thow-Hing ........ G06T 7/73
                                                        382/106
(Continued)

FOREIGN PATENT DOCUMENTS

CN          1162681        8/2004
IN       201948035405      9/2019
(Continued)

OTHER PUBLICATIONS

Hernandez-Lopez, Jose-Juan, et al. "Detecting objects using color and depth segmentation with Kinect sensor." Procedia Technology 3 (2012): 196-204. (Year: 2012).*
(Continued)

*Primary Examiner* — Geoffrey E Summers
(74) *Attorney, Agent, or Firm* — Wenderoth, Lind & Ponack, L.L.P.

(57)                    ABSTRACT

The present invention definitively and efficiently calculates a three-dimensional plane of a workpiece to be measured by automating the mask processing. A mask-setting device which, when obtaining three-dimensional information about a workpiece by using a three-dimensional sensor, sets a mask which makes three-dimensional points outside a measurement target region not usable in the calculation of a three-dimensional plane, said device being equipped with an outline extraction unit for subjecting a two-dimensional image of the workpiece which is captured by a camera to pattern recognition, and extracting an outline of the workpiece therefrom, a height information acquisition unit for
(Continued)

acquiring height information about the outline from a distance image among the three-dimensional information acquired by the three-dimensional sensor; and a mask-setting unit for setting a mask in a region outside the workpiece on the basis of the height information.

3 Claims, 9 Drawing Sheets

(51) Int. Cl.
*G06T 7/194* (2017.01)
*G06V 10/25* (2022.01)

(52) U.S. Cl.
CPC .............. *G06T 2207/10024* (2013.01); *G06T 2207/10028* (2013.01); *G06T 2207/30164* (2013.01)

(58) Field of Classification Search
CPC ........ G06T 7/0004; G06T 2207/30164; G06V 10/25
See application file for complete search history.

(56) References Cited

U.S. PATENT DOCUMENTS

2013/0114861 A1* 5/2013 Takizawa .................. G06T 7/74
382/106

2015/0224650 A1 8/2015 Xu et al.
2017/0124717 A1* 5/2017 Baruch ................... G06T 7/136
2018/0150699 A1* 5/2018 Yasunaga ................. G06T 7/11
2022/0067960 A1* 3/2022 Guo .......................... G06T 7/62

FOREIGN PATENT DOCUMENTS

| | | |
|---|---|---|
| JP | 7-88791 | 4/1995 |
| JP | 7-287756 | 10/1995 |
| JP | 2005-140953 | 6/2005 |
| JP | 2013-101045 | 5/2013 |
| JP | 2016-132521 | 7/2016 |
| TW | 201721588 | 6/2017 |
| TW | 202035255 | 10/2020 |
| WO | 98/15915 | 4/1998 |

OTHER PUBLICATIONS

Xu, Hui, et al. "RGB-D-based pose estimation of workpieces with semantic segmentation and point cloud registration." Sensors 19.8 (2019): 1873. (Year: 2019).*
SrirangamSridharan, ShreeRanjani, et al. "Object localization and size estimation from RGB-D images." arXiv preprint arXiv: 1808. 00641v1 (2018). (Year: 2018).*
International Search Report issued Dec. 14, 2021 in corresponding International Application No. PCT/JP2021/040772.

* cited by examiner

FIG. 3

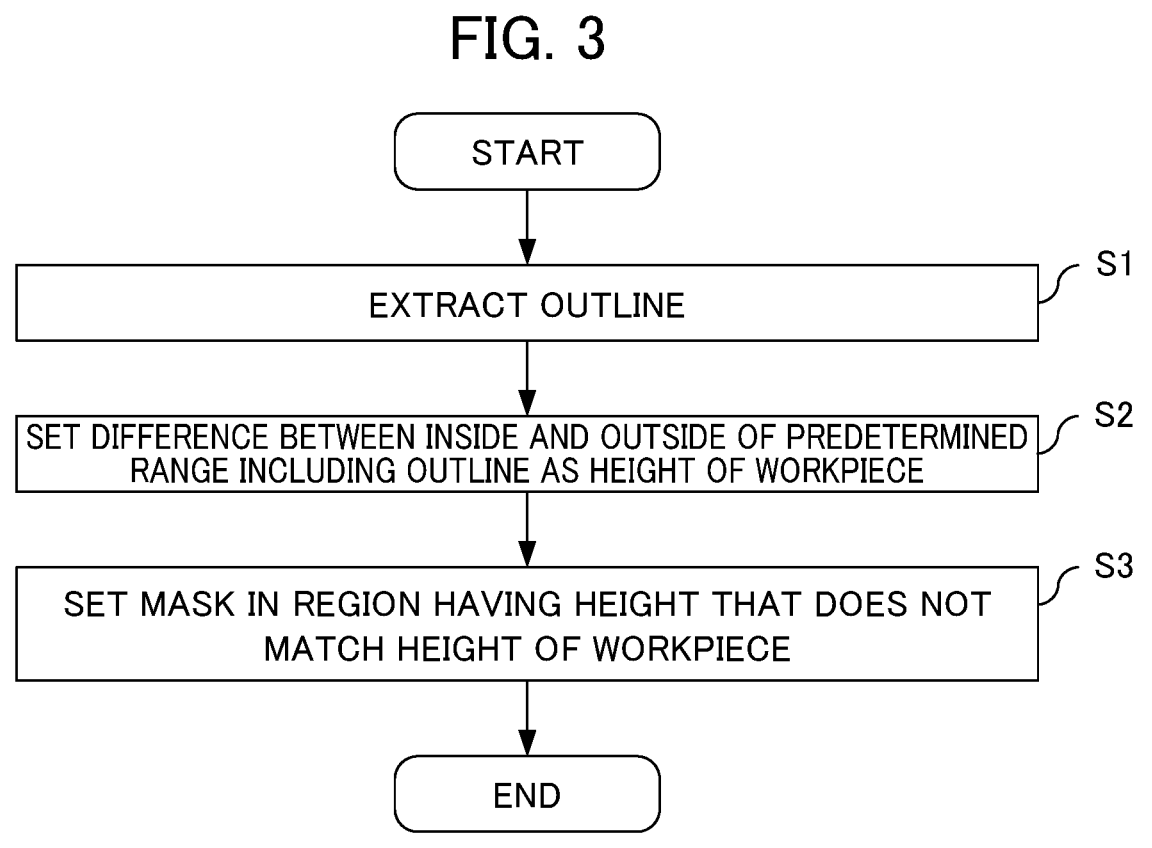

START

EXTRACT OUTLINE — S1

SET DIFFERENCE BETWEEN INSIDE AND OUTSIDE OF PREDETERMINED RANGE INCLUDING OUTLINE AS HEIGHT OF WORKPIECE — S2

SET MASK IN REGION HAVING HEIGHT THAT DOES NOT MATCH HEIGHT OF WORKPIECE — S3

END

[CAMERA IMAGE]

OUTLINE DETECTED BY
PATTERN RECOGNITION

[DISTANCE IMAGE]

ACQUIRE HEIGHT INFORMATION

MASK REGION

THREE-DIMENSIONAL
MEASUREMENT
REGION

[CAMERA IMAGE]

WITHIN SET REGION OF MODEL PATTERN (c)

[DISTANCE IMAGE]

(a)

(d)

(b)

MASK REGION

THREE-DIMENSIONAL MEASUREMENT REGION (a)        (b)        (c)        (d)

MASK-SETTING DEVICE

TECHNICAL FIELD

The present invention relates to a mask-setting device.

BACKGROUND ART

In order to take out randomly stacked workpieces with a robot, measuring by a three-dimensional sensor is effective. As one technique for acquiring three-dimensional information of a workpiece by a three-dimensional sensor, there exists a technique wherein two-dimensional model detection and three-dimensional plane calculation are combined. The gist of this technique is described below.

First, two-dimensional features of the workpiece are registered as model patterns, and a model pattern that is identical to the registered model pattern is detected from a two-dimensional image captured by an imaging device such as a camera. This enables acquisition of the two-dimensional position of the workpiece.

Next, three-dimensional measurement is performed with respect to the vicinity of the position where the model pattern was detected, and a region in which measured three-dimensional points are continuous on a plane (hereafter referred to as a "three-dimensional plane") is calculated. This enables acquisition of three-dimensional information such as the height and the inclination of the workpiece.

The region wherein the three-dimensional points are detected on a plane by the three-dimensional sensor is not necessarily a workpiece that is subject to measurement, and consequently not necessarily a workpiece that is subject to movement or processing. That is to say, there is a possibility that even a region in which no workpiece is actually present may be considered as a part of the three-dimensional plane due to the result of the calculation. Therefore, there is a need for image processing to ensure that the three-dimensional points of a region that is not subject to measurement, and consequently not subject to moving or processing, are not used in the calculation of the three-dimensional plane. This kind of processing is referred to as "mask processing", and the unused region is referred to as a "mask".

In this regard, a technique is known of generating a mask image corresponding to an upper surface of a stack from an entire image, applying the mask image to the entire image, and detecting an outline from the image obtained thereby. (For example, see Patent Document 1.)

Patent Document 1: Japanese Unexamined Patent Application, Publication No. 2016-132521

DISCLOSURE OF THE INVENTION

Problems to be Solved by the Invention

In the field of mask processing there is a need for a user to perform the process while visually confirming the position of the model pattern on the camera image, and there was thus a problem in that skill and time were required.

There is a demand for definitively and efficiently calculating a three-dimensional plane of a workpiece to be measured by automating the mask processing.

Means for Solving the Problems

An aspect of the present disclosure is a mask-setting device that, when obtaining three-dimensional information about a workpiece by using a three-dimensional sensor, sets a mask that makes three-dimensional points that are outside a measurement target region not usable in a calculation of a three-dimensional plane, the mask-setting device including an outline extraction unit for performing pattern recognition of a two-dimensional image of the workpiece that is captured by a camera, and extracting an outline of the workpiece therefrom, a height information acquisition unit for acquiring height information about the outline from a distance image among the three-dimensional information acquired by the three-dimensional sensor, and a mask-setting unit for setting a mask in a region other than the workpiece on the basis of the height information.

Another aspect of the present disclosure is a mask-setting device that, when obtaining three-dimensional information about a workpiece by using a three-dimensional sensor, sets a mask that makes three-dimensional points that are outside a measurement target region not usable in a calculation of a three-dimensional plane, the mask-setting device including a two-dimensional model detection unit for performing pattern recognition of a two-dimensional image of the workpiece that is captured by a camera, and detecting a two-dimensional model therefrom, a connected point set detection unit for detecting, in a vicinity of a position at which the two-dimensional model was detected, from a three-dimensional point group obtained from the three-dimensional sensor, connected point sets wherein points close to one another are connected, and a mask-setting unit for setting a mask in a region other than the workpiece among the detected connected point sets.

Another aspect of the present disclosure is a three-dimensional information measuring device that measures three-dimensional information of a workpiece by a three-dimensional sensor, the three-dimensional information measuring device including an outline extraction unit for performing pattern recognition of a two-dimensional image of the workpiece that is captured by a camera, and extracting an outline of the workpiece therefrom, a height information acquisition unit for acquiring height information about the outline from a distance image among the three-dimensional information acquired by the three-dimensional sensor, and a three-dimensional information acquisition unit for extracting only a region of the workpiece and acquiring three-dimensional information of the workpiece, on the basis of the height information.

Effects of the Invention

According to an aspect of the present invention, a three-dimensional plane of a workpiece to be measured can be definitively and efficiently calculated by automating the mask processing.

BRIEF DESCRIPTION OF THE DRAWINGS

FIG. 3 is a flowchart illustrating an operation of the mask-setting device according to the first embodiment;

PREFERRED MODE FOR CARRYING OUT
THE INVENTION

1 First Embodiment

A first embodiment of the present invention is described below with reference to FIGS. 1 to 4B.

1.1 Configuration of the First Embodiment

Figure 1:
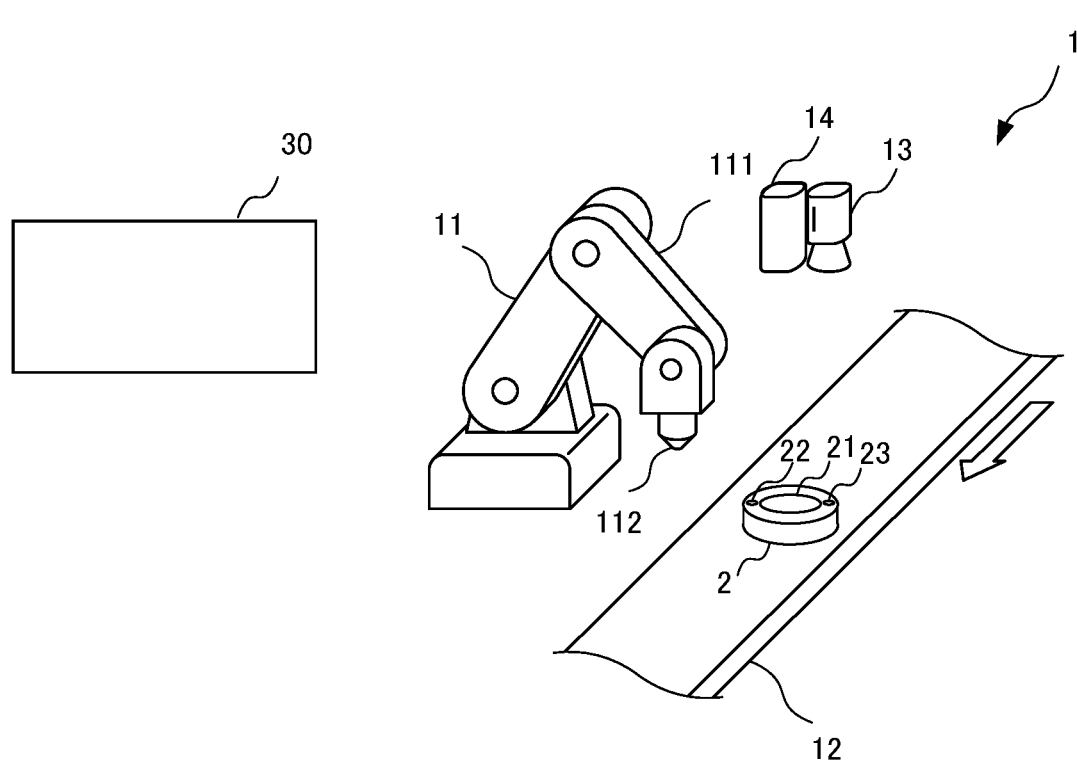
FIG. 1 illustrates the overall configuration of a robot system according to a first embodiment.

FIG. 1 illustrates the overall configuration of a robot system 1 according to the first embodiment of the present invention. As illustrated in FIG. 1, the robot system 1 according to the first embodiment is provided with a robot 11, a conveyor 12, a fixed camera (hereafter simply referred to as a "camera") 13, a three-dimensional sensor 14, and a mask-setting device 30.

On the conveyor 12, a workpiece 2, for example, is conveyed. In the example illustrated in FIG. 1, the workpiece 2 is provided with through-holes 21, 22, 23.

The robot 11 has a plurality of driving shafts and positions a tip part. The robot 11 is typically a vertical articulated robot as illustrated, but the robot may also be, for example, an orthogonal coordinate robot, a SCARA robot, a parallel link robot, or the like.

In the present embodiment in particular, the robot 11 is a robot for picking up a workpiece 2 that is conveyed on the conveyor 12 from upstream. The robot 11 is provided with an arm 111 and a hand 112. The hand 112 is provided at a tip part of the arm 111. The robot 11 causes the hand 112 to approach a target workpiece 2 by driving the arm 111, and picks up the workpiece 2 using the hand 112.

The conveyor 12 is a device for conveying the workpiece 2 from the upstream side of the robot 11 toward the downstream side of the robot 11. The conveyor 12 may be, for example, a belt conveyor.

The fixed camera 13 is a device for capturing an image of the workpiece 2 being conveyed on the conveyor 12 on the upstream side of the robot 11. The fixed camera 13 preferably has a fixed position relative to the conveyor 12, but is not so limited. In addition, the fixed camera 13 is a camera particularly for capturing a two-dimensional image of the workpiece 2, and generally has a lower cost than the three-dimensional sensor 14 described below, but is not so limited.

In the present embodiment in particular, the fixed camera 13 is used for acquiring a rough position of the workpiece 2 on the conveyor 12, but may also be provided with functions that the fixed camera 13 normally has.

The three-dimensional sensor 14 is a sensor capable of capturing a three-dimensional image of an object. In the present embodiment in particular, the three-dimensional sensor 14 is fixed adjacent to the fixed camera 13. Thus, the three-dimensional sensor 14 is capable of acquiring three-dimensional information of the workpiece 2 from approximately the same angle as the fixed camera 13. However, the three-dimensional sensor 14 is not so limited, and may be installed at any position so long as the position allows for capturing a three-dimensional image of the workpiece 2.

The mask-setting device 30 is a device for, when acquiring three-dimensional information of the workpiece 2 by the three-dimensional sensor 14, setting a mask that makes three-dimensional points that are outside a measurement target region not usable in a calculation of a three-dimensional plane.

The mask-setting device 30 is constituted by a microprocessor (not illustrated) including a CPU and a memory. In the mask-setting device 30, the CPU of the microprocessor executes various types of control according to a prescribed program that is read from the memory. Part of the functions of the mask-setting device 30 is described below.

Figure 2:
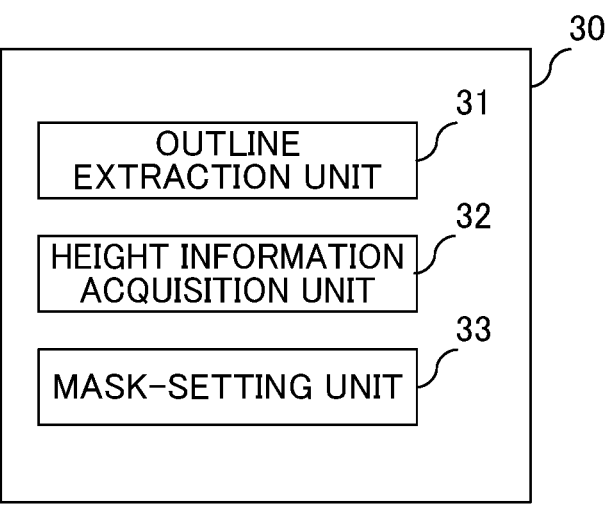
FIG. 2 is a functional block diagram of a mask-setting device according to the first embodiment.

FIG. 2 is a functional block diagram of the mask-setting device 30. The mask-setting device 30 is provided with an outline extraction unit 31, a height information acquisition unit 32, and a mask-setting unit 33.

The outline extraction unit 31 performs pattern recognition of the two-dimensional image of the workpiece 2 captured by the fixed camera 13, and extracts the outline of the workpiece 2.

More specifically, the outline extraction unit 31 extracts the outline of the workpiece 2 by performing pattern recognition of the two-dimensional image of the workpiece 2, using a model pattern indicating the two-dimensional features of the workpiece 2 registered in a storage unit (not illustrated) of the mask-setting device 30.

The height information acquisition unit 32 acquires height information about the outline extracted by the outline extraction unit 31 from a distance image among the three-dimensional information acquired by the three-dimensional sensor 14.

More specifically, the height information acquisition unit 32 may acquire the difference between an inside height and an outside height of a predetermined range on either side of the outline as the height information of the workpiece 2.

On the basis of the height information acquired by the height information acquisition unit 32, the mask-setting unit 33 sets a mask in the region other than the workpiece 2.

More specifically, the mask-setting unit 33 may set the mask uniformly with respect to a region having a height that does not match the height of the workpiece 2 as the region other than the workpiece 2.

It is thus possible to perform mask processing of a region excluding the plane in which the workpiece 2 is present. The reason for using the height information of the portions of the regions away inwardly or outwardly from the outline by a predetermined range, and not the height information of the outline itself, is because height information acquired by common three-dimensional sensors characteristically has a particularly large degree of error in the vicinity of the outline of an object.

1.2 Operation of the First Embodiment

An operation of the mask-setting device 30 according to the first embodiment is described below with reference to FIGS. 3 to 4B. FIG. 3 is a flowchart illustrating the operation of the mask-setting device 30 according to the first embodiment. In addition, FIGS. 4A and 4B illustrate the processing details at each step constituting the flowchart of FIG. 3.

At Step S1, the outline extraction unit 31 extracts the outline of the workpiece 2 by performing pattern recognition of the two-dimensional image of the workpiece 2, using the registered model pattern indicating the two-dimensional features of the workpiece 2.

Figure 4A:
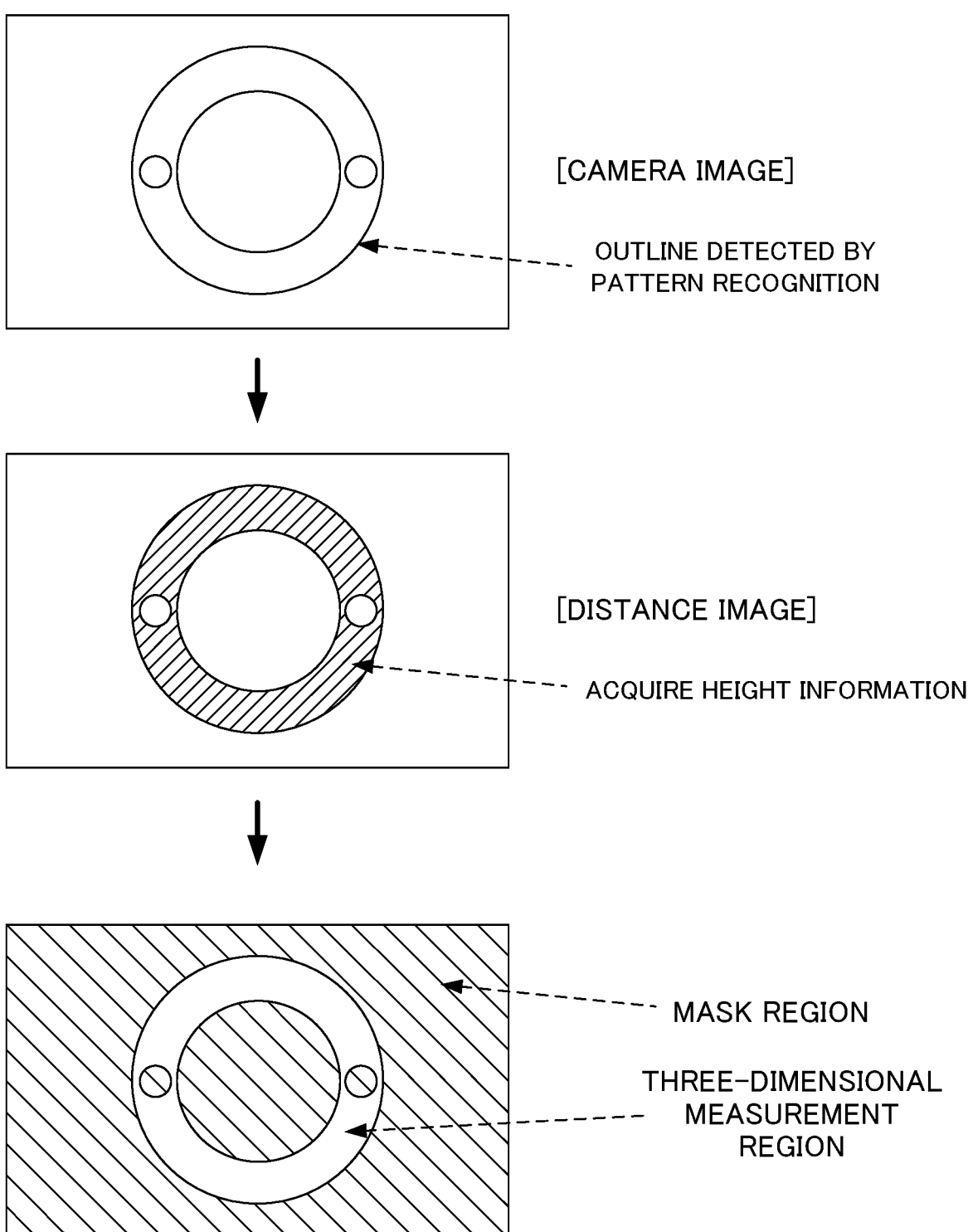
FIG. 4A illustrates the processing details at each step constituting the flowchart of FIG. 3.
Figure 4B:
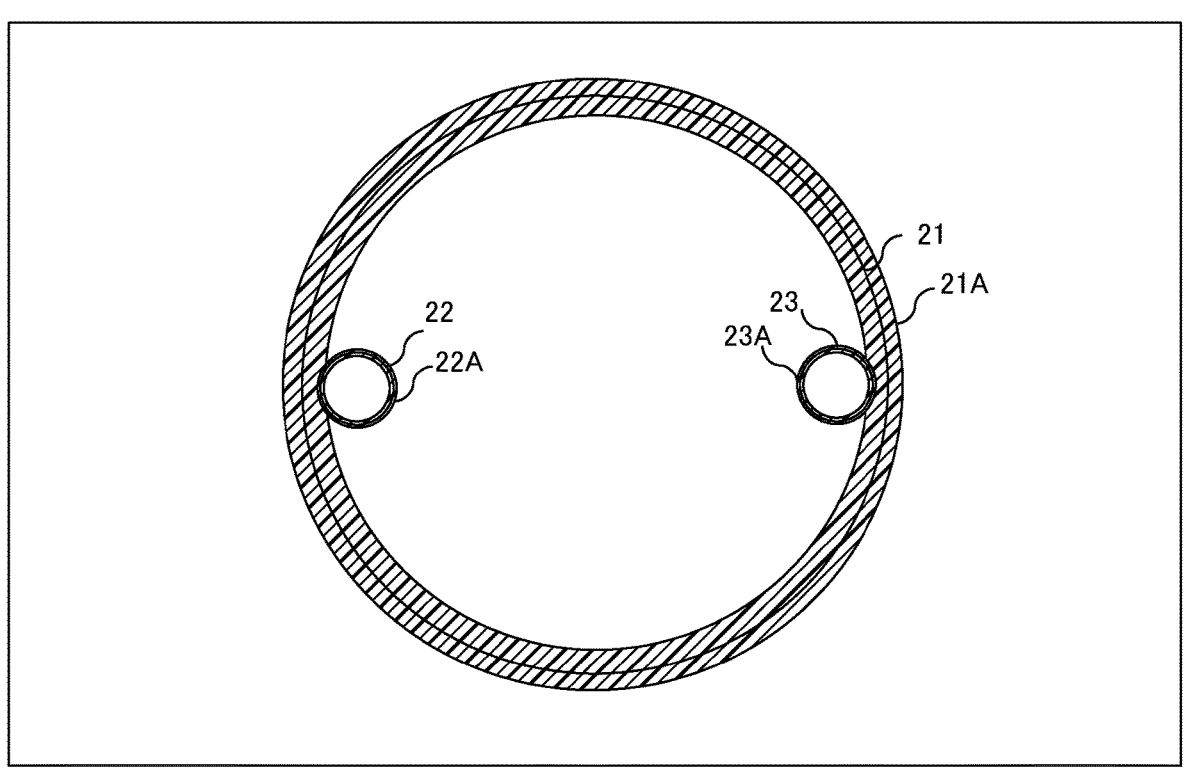
FIG. 4B illustrates the processing details at each step constituting the flowchart of FIG. 3.

At this time, as illustrated by the upper illustration of FIG. 4A, the outline of the workpiece 2 is extracted by pattern recognition in the camera image (the two-dimensional image).

At Step S2, the height information acquisition unit 32 sets the difference between an inside height and an outside height of a predetermined range on either side of the outline as the height of the workpiece 2.

Specifically, the height information acquisition unit 32 sets as the height of the workpiece 2 the difference between an inside height and an outside height of three width-having circles 21A to 23A, which are predetermined ranges on either side of the outlines of the through-holes 21 to 23 as seen in a top view of the workpiece 2, as indicated by the hatched portions in FIG. 4B. As a result, it is possible to acquire the height information of the workpiece 2, indicated by the hatched portion in the distance image (three-dimensional image), as illustrated by the middle illustration in FIG. 4A.

At Step S3, the mask-setting unit 33 sets the mask uniformly with respect to a region having a height that does not match the height of the workpiece 2 as the region other than the workpiece 2. As a result, the mask is set with respect to the hatched portion in the lower illustration of FIG. 4A.

2 Second Embodiment

A second embodiment of the present invention is described below with reference to FIGS. 5 to 7B.

2.1 Configuration of the Second Embodiment

The overall configuration of a robot system 1A according to the second embodiment is approximately identical to the overall configuration of the robot system 1 illustrated in FIG. 1, and therefore detailed description and depiction thereof is omitted. The robot system 1A differs from the robot system 1 in that a mask-setting device 30A is provided instead of the mask-setting device 30.

The mask-setting device 30A, like the mask-setting device 30, is a device for, when acquiring three-dimensional information of the workpiece 2 by the three-dimensional sensor 14, setting a mask that makes three-dimensional points that are outside a measurement target region not usable in a calculation of a three-dimensional plane.

The mask-setting device 30A, like the mask-setting device 30, is constituted by a microprocessor (not illustrated) including a CPU and a memory. In the mask-setting device 30A, the CPU of the microprocessor executes various types of control according to a prescribed program that is read from the memory. Part of the functions of the mask-setting device 30A is described below.

Figure 5:
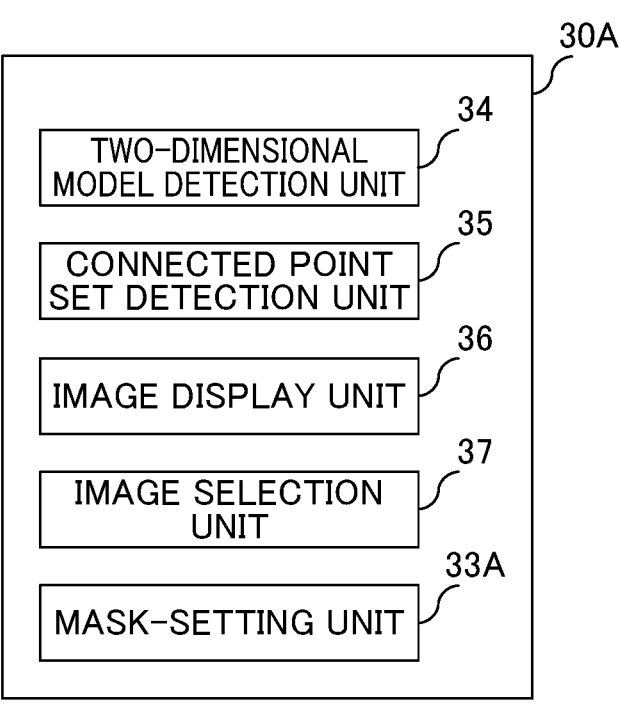
FIG. 5 is a functional block diagram of a mask-setting device according to a second embodiment.

FIG. 5 is a functional block diagram of the mask-setting device 30A. The mask-setting device 30A is provided with a two-dimensional model detection unit 34, a connected point set detection unit 35, an image display unit 36, an image selection unit 37, and a mask-setting unit 33A.

The two-dimensional model detection unit 34 detects a two-dimensional model by performing pattern recognition of the two-dimensional image of the workpiece 2 captured by the fixed camera 13.

More specifically, the two-dimensional model detection unit 34 detects a two-dimensional model by performing pattern recognition of the two-dimensional image of the workpiece 2, using a model pattern indicating the two-dimensional features of the workpiece 2 registered in a storage unit (not illustrated) of the mask-setting device 30.

In the vicinity of the position at which the two-dimensional model detected by the two-dimensional model detection unit 34 was detected, the connected point set detection unit 35 detects, from a three-dimensional point group acquired by the three-dimensional sensor 14, connected point sets wherein points close to one another are connected. The "vicinity of the detected position" is, for example, within a rectangular range having a prescribed shape including the detected two-dimensional model.

When a plurality of connected point sets detected by the connected point set detection unit 35 are present, the image display unit 36 displays a list of each of these connected point sets as partial images corresponding to a portion of all of the connected point sets.

On the basis of an operation by a user, the image selection unit 37 selects, from the list of partial images displayed by the image display unit 36, a portion that the user wishes to measure.

The mask-setting unit 33A sets the mask in a region other than the workpiece 2 among the detected connected point sets.

More specifically, a partial image that is a connected point set indicating the workpiece 2 itself or a specific plane included in the workpiece 2 is selected from the detected connected point sets by using the image selection unit 37, by an operator of the mask-setting device 30A, and the mask-setting unit 33A may set the mask in the region other than the selected partial image.

Thus, even when a plurality of planes are present in a single workpiece 2 in the region measured by the three-dimensional sensor 14, or when a plurality of workpieces 2 are present in the region measured by the three-dimensional sensor 14 and on the same plane, it is possible to automatically detect only a specific workpiece plane to be measured. When a plurality of workpieces 2 are present in the region measured by the three-dimensional sensor 14 and on the same plane, connected point sets that are separated from each other are determined to be separate workpieces.

2.2 Operation of the Second Embodiment

Figure 6:
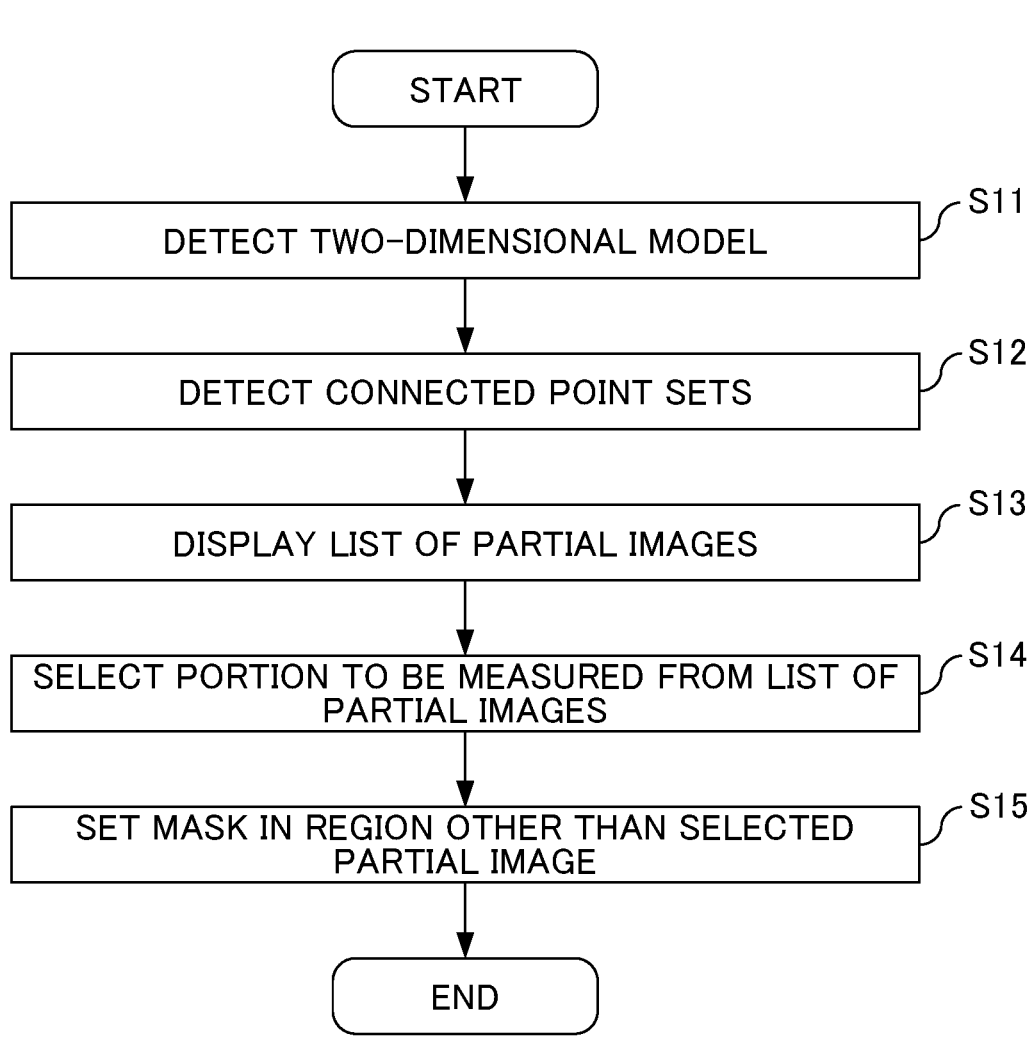
FIG. 6 is a flowchart illustrating an operation of the mask-setting device according to the second embodiment.

An operation of the mask-setting device 30A according to the second embodiment is described below with reference to FIGS. 6 to 7B. FIG. 6 is a flowchart illustrating the operation of the mask-setting device 30A according to the second embodiment. In addition, FIGS. 7A and 7B illustrate the processing details at each step constituting the flowchart of FIG. 6.

At Step S11, the two-dimensional model detection unit 34 detects a two-dimensional model by performing pattern recognition of a two-dimensional image of the workpiece 2, using a model pattern indicating two-dimensional features of the workpiece 2.

Figure 7A:
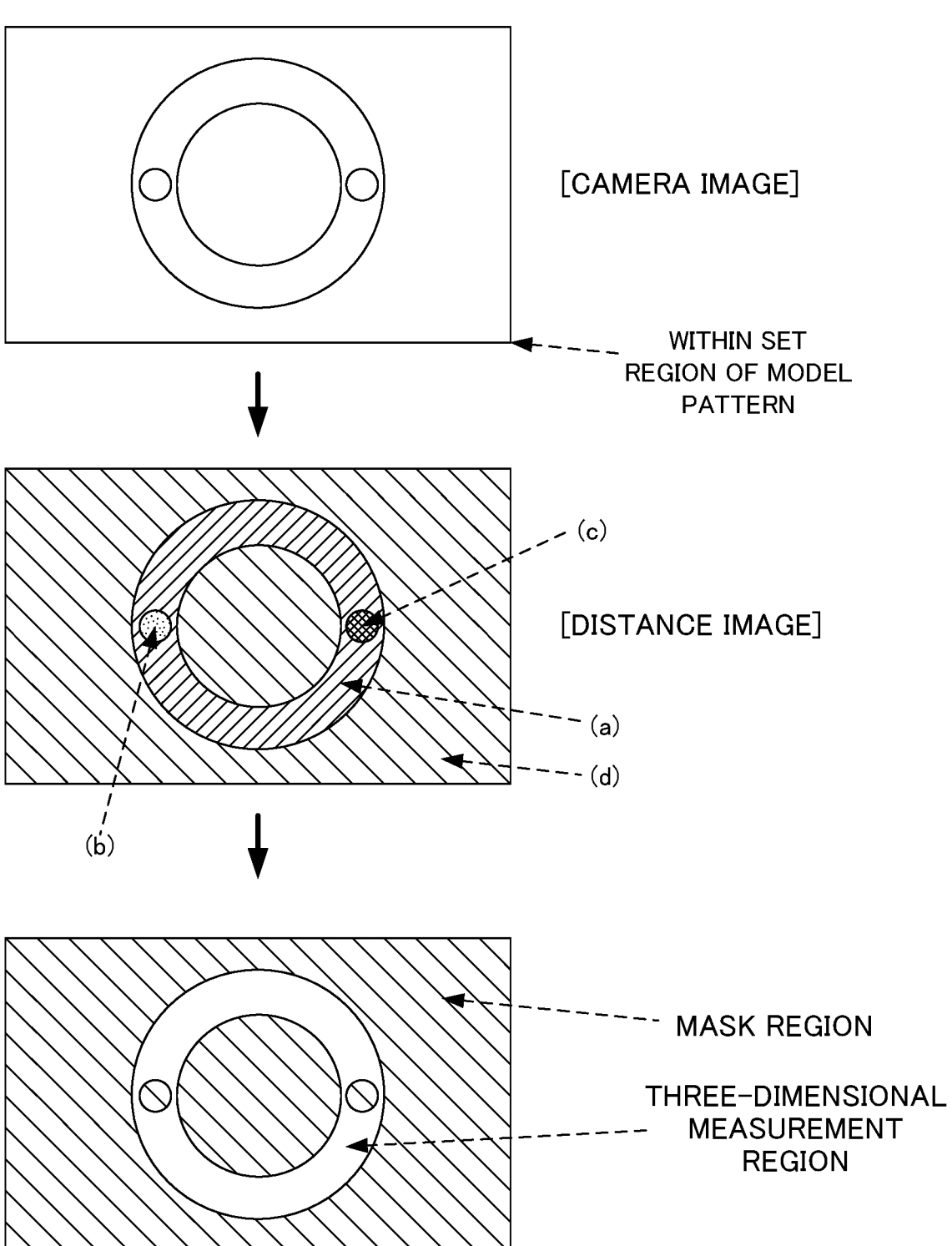
FIG. 7A illustrates the processing details at each step constituting the flowchart of FIG. 6.
Figure 7B:
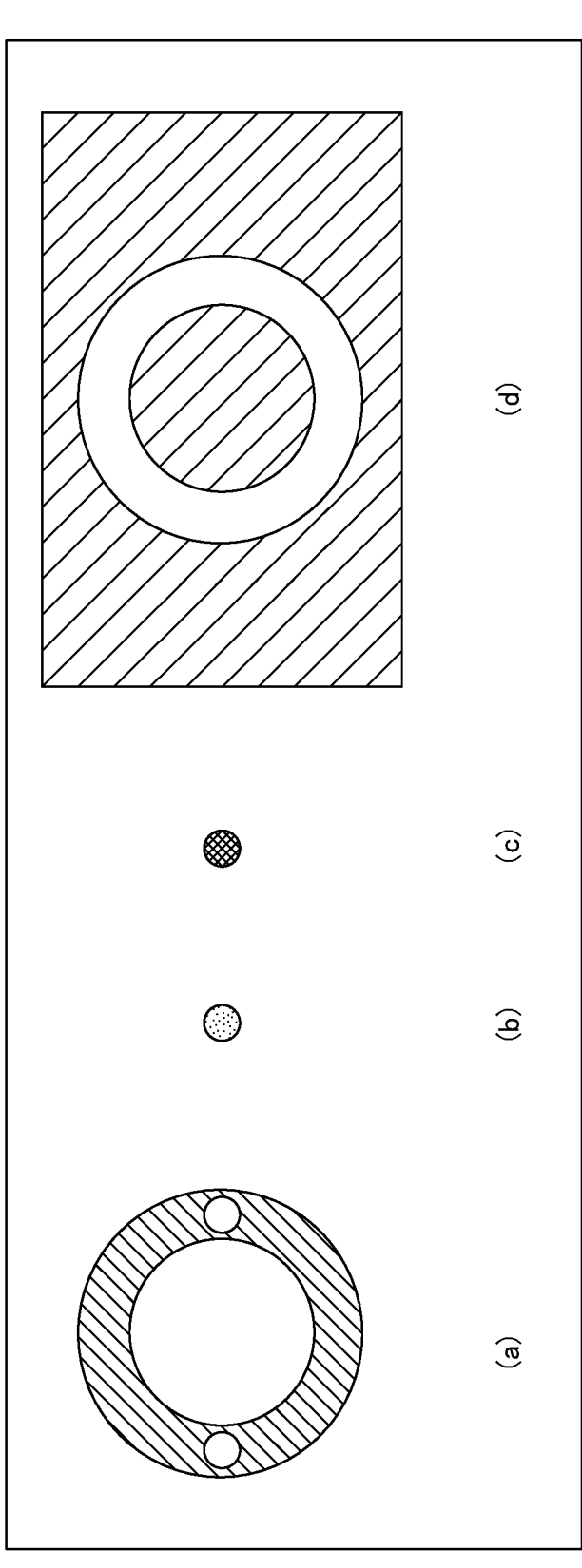
FIG. 7B illustrates the processing details at each step constituting the flowchart of FIG. 6.

At this time, as illustrated by the upper illustration of FIG. 7A, the two-dimensional image of the workpiece 2 is extracted by pattern recognition in the camera image (the two-dimensional image).

At Step S12, the connected point set detection unit 35 detects, in the vicinity of the position at which the two-dimensional model detected by the two-dimensional model detection unit 34 was detected, from a three-dimensional point group acquired by the three-dimensional sensor 14, connected point sets wherein points close to one another are connected.

At this time, as illustrated by the middle illustration in FIG. 7A, four types of connected point sets (a) to (d), indicated by different hatchings, are detected. That is to say, regions having different heights are detected as separate connected point sets.

At this time, it is possible to render undetectable a connection point set that is smaller compared to other connection point sets, by adjusting the parameters used when performing detection by the connected point set detection unit 35.

At Step S13, the image display unit 36 displays a list of each of the connected point sets as partial images corresponding to a portion of all of the connected point sets.

At this time, as illustrated in FIG. 7B, the four types of connected point sets (a) to (d) in the middle illustration of FIG. 7A are respectively displayed as thumbnails by a display device (not illustrated) provided to the mask-setting device 30A.

At Step S14, the image selection unit 37 selects, on the basis of an operation by a user, a portion that the user wishes to measure from the list of partial images displayed by the image display unit 36.

At this time, the operator of the mask-setting device 30A selects (a) from the thumbnails (a) to (d) as the connected point set indicating the workpiece 2. Thus, as illustrated by the lower illustration in FIG. 7A, the mask is set in the region other than the connection point set (a).

At Step S15, the mask-setting unit 33A sets the mask in the region other than the selected partial image among the connected point sets detected by the connected point set detection unit 35.

3 Effects Exhibited by the First Embodiment and the Second Embodiment

A mask-setting device (for example, the "mask-setting device 30") according to the embodiments described above, when obtaining three-dimensional information about a workpiece (for example, the "workpiece 2") by using a three-dimensional sensor (for example, the "three-dimensional sensor 14"), sets a mask that makes three-dimensional points that are outside a measurement target region not usable in a calculation of a three-dimensional plane, the mask-setting device including an outline extraction unit (for example, the "outline extraction unit 31") for performing pattern recognition of a two-dimensional image of the workpiece that is captured by a camera (for example, the "fixed camera 13"), and extracting an outline of the workpiece therefrom, a height information acquisition unit (for example, the "height information acquisition unit 32") for acquiring height information about the outline from a distance image among the three-dimensional information acquired by the three-dimensional sensor, and a mask-setting unit (for example, the "mask-setting unit 33") for setting a mask in a region other than the workpiece on the basis of the height information.

It is thus possible to definitively and efficiently calculate a three-dimensional plane of a workpiece to be measured by automating the mask processing. In addition, there is no need to set the mask by visual confirmation by a user, and therefore even a user who is not accustomed to operating the three-dimensional sensor 14 can easily perform mask processing.

In the mask-setting device according to the embodiments described above, the height information acquisition unit may recognize a difference between an inside and an outside of a predetermined range on either side of the outline as the height of the workpiece, and the mask-setting unit may set the mask in a region having a height that does not match the height of the workpiece as the region other than the workpiece.

It is thus possible to perform mask processing of a region excluding the plane in which the workpiece 2 is present. In addition, height information acquired by common three-dimensional sensors characteristically has a particularly large degree of error in the vicinity of the outline of an object, but this error can be minimized.

A mask-setting device (for example, the "mask-setting device 30A") according to the embodiments described above, when obtaining three-dimensional information about a workpiece by using a three-dimensional sensor, sets a mask that makes three-dimensional points that are outside a measurement target region not usable in a calculation of a three-dimensional plane, the mask-setting device including a two-dimensional model detection unit (for example, the "two-dimensional model detection unit 34") for performing pattern recognition of a two-dimensional image of the workpiece that is captured by a camera, and detecting a two-dimensional model therefrom, a connected point set detection unit (for example, the "connected point set detection unit 35") for detecting, in the vicinity of a position at which the two-dimensional model was detected, from a three-dimensional point group obtained from the three-dimensional sensor, connected point sets wherein points close to one another are connected, and a mask-setting unit (for example, the "mask-setting unit 33A") for setting a mask in a region other than the workpiece among the detected connected point sets.

It is thus possible to automatically detect only a specific workpiece plane to be measured, even when a plurality of planes are present in a single workpiece in the region measured by the three-dimensional sensor 14, or when a plurality of workpieces 2 are present in the region measured by the three-dimensional sensor 14 and on the same plane.

The mask-setting device according to the embodiments described above may further include an image display unit (for example, the "image display unit 36") for displaying a list of partial images that are the plurality of connected point sets detected by the connected point set detection unit, and an image selection unit (for example, the "image selection unit 37") for selecting, from the list of partial images displayed by the image display unit, a portion that a user wishes to measure, wherein the mask-setting unit sets the mask in a region other than the partial image selected by the image selection unit.

It is thus possible for the user of the mask-setting device 30A to set the mask with a simple method of checking a list of candidate partial images corresponding to a portion to be measured and selecting the portion to be measured from the candidates displayed in the list.

4 Variant

Embodiments of the present invention are described above, but the present invention is not limited to these embodiments. In addition, the effects described in the present embodiments are merely a list of the most preferred effects caused by the present invention, and the effects of the present invention are not limited to those described in the present embodiments.

For example, in the mask-setting device 30 according to the first embodiment, the outline extraction unit 31 extracts the outline of the workpiece, the height information acquisition unit 32 acquires height information about the outline from a distance image among the three-dimensional information, and the mask-setting unit 33 sets the mask in the region other than the workpiece, on the basis of the height information. However, the present invention is not so limited.

Specifically, instead of the mask-setting unit 33, with providing a three-dimensional information acquisition unit that, on the basis of the height information, extracts only the region of the workpiece and acquires three-dimensional information of the workpiece, it is possible to realize a three-dimensional information measuring device that acquires height information every time a workpiece is detected and excludes the region other than that height from the three-dimensional information, and not a mask-setting device.

It is thus possible to definitively extract only the region of the workpiece even for workpieces having individual height differences, by acquiring and using height information for each workpiece rather than setting the mask in advance.

The mask-setting method by the mask-setting devices 30 and 30A is realized by software. When the method is realized by software, programs that constitutes the software are installed on a computer (the mask-setting devices 30 and 30A). The programs may be recorded on removable media and distributed to users, or may be distributed by being downloaded onto a user's computer via a network. Further, the programs may be provided to the user's computer (the mask-setting devices 30 and 30A) as a web service via a network, without being downloaded.

EXPLANATION OF REFERENCE NUMERALS

1, 1A Robot system
2 Workpiece
13 Fixed camera (camera)
14 Three-dimensional sensor
30, 30A Mask-setting device
31 Outline extraction unit
32 Height information acquisition unit
33, 33A Mask-setting unit
34 Two-dimensional model detection unit
35 Connected point set detection unit

The invention claimed is:

1. A mask-setting device that, when obtaining three-dimensional information about a workpiece by using a three-dimensional sensor, sets a mask that makes three-dimensional points that are outside a measurement target region not usable in a calculation of a three-dimensional plane, the mask-setting device comprising:

a processor configured to:

perform pattern recognition of a two-dimensional image of the workpiece that is captured by a camera, and extract an outline of the workpiece therefrom;

acquire height information about the outline from a distance image among the three-dimensional information acquired by the three-dimensional sensor, and recognize a height of the workpiece based on a difference in height between regions away inwardly and outwardly from the outline by a predetermined range; and set a mask in a region other than the workpiece on the basis of the height information.

2. The mask-setting device according to claim 1, wherein the processor is further configured to set the mask in a region having a height that does not match the height of the workpiece as the region other than the workpiece.

3. A three-dimensional information measuring device that measures three-dimensional information of a workpiece by a three-dimensional sensor, the three-dimensional information measuring device comprising:

a processor configured to:

perform pattern recognition of a two-dimensional image of the workpiece that is captured by a camera, and extract an outline of the workpiece therefrom;

acquire height information about the outline from a distance image among the three-dimensional information acquired by the three-dimensional sensor, and recognize a height of the workpiece based on a difference in height between regions away inwardly and outwardly from the outline by a predetermined range; and extract only a region of the workpiece and acquire three-dimensional information of the workpiece, on the basis of the height information.

* * * * *